Feb. 8, 1938. E. H. PITNEY 2,107,875
CRANK CONSTRUCTION FOR REELS
Filed June 10, 1935
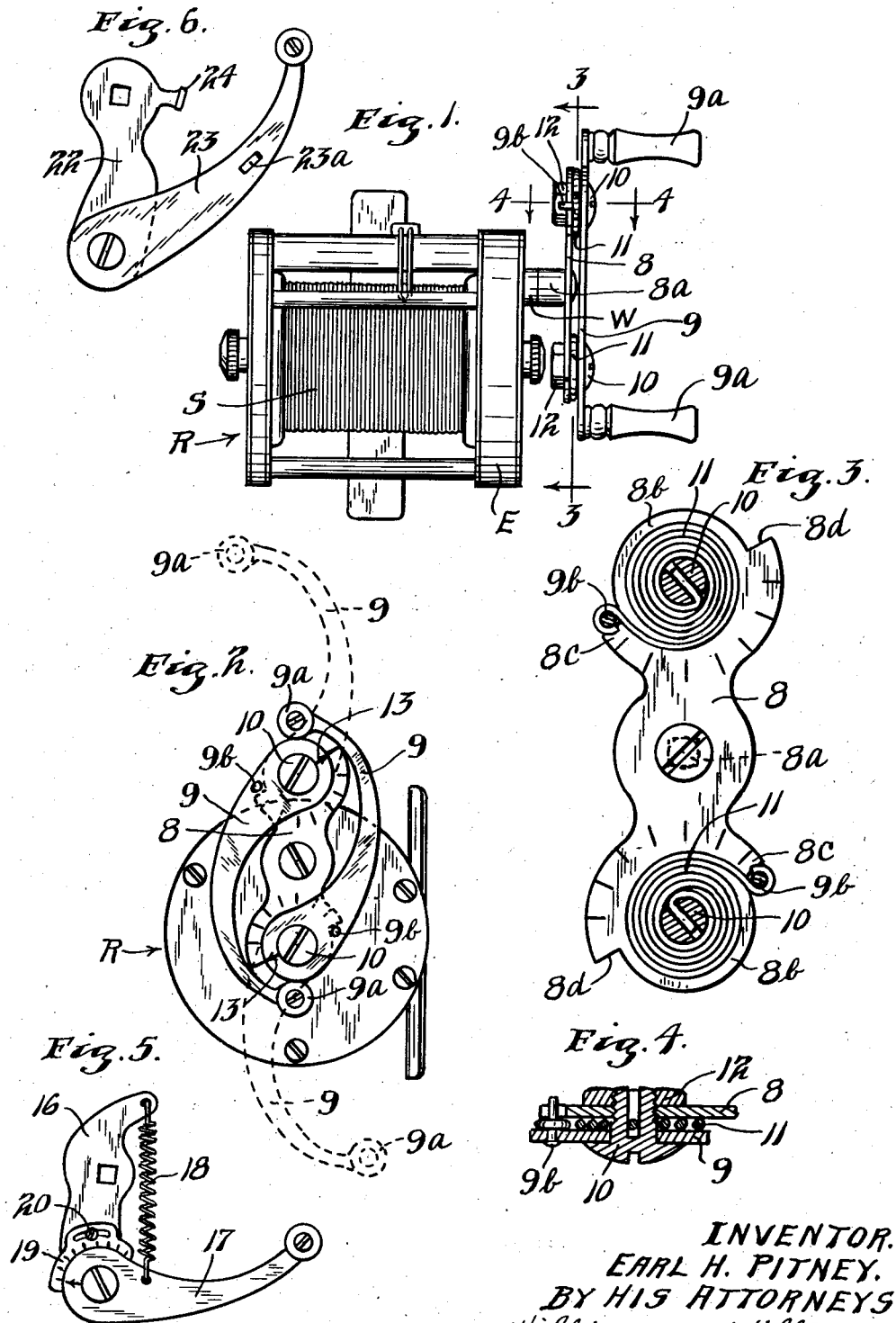
INVENTOR.
EARL H. PITNEY.
BY HIS ATTORNEYS.
Williamson & Williamson Patented Feb. 8, 1938

2,107,875

UNITED STATES PATENT OFFICE 2,107,875

CRANK CONSTRUCTION FOR REELS

Earl H. Pitney, Excelsior, Minn.

Application June 10, 1935, Serial No. 25,777

5 Claims. (Cl. 74—546).

This invention relates to reels of the type for winding a flexible element upon a spool, such as, for example, fishing reels and relates more particularly to an improved crank construction associated with the winding shaft in such manner that greater torsional leverage will automatically be obtained as required according to the strain or pull upon the reel.

It is an object of my invention to provide a crank construction for reels of the general class above referred to wherein the torsional leverage is proportionately increased as required according to strains or pulls imposed upon the line or flexible element being wound and wherein further, yielding action is provided for overcoming the tendency of sharp pulls or jerks to break the line or flexible element being wound.

It is a further object in a device of the class described to provide a means for indicating the amount of pull or strain imposed, calibrations being provided by two relatively movable parts which vary their positions in accordance with the strains imposed on the line or flexible element.

With special applicability to fishing reels, my invention is particularly well adapted to prevent breakage of light lines when strains or sudden jerks from large fish are encountered, thereby enabling lighter lines to be used when fishing for game fish and consequently enabling greater distance and accuracy to be obtained in casting.

And further, in connection with fishing reels, it is an object to provide a means associated with the crank construction for roughly weighing a fish after it has been caught and in fact determining with some approximation the size of a fish when a steady pull is imposed upon the line.

Another object is the provision of improved crank construction wherein a crank arm is connected with an element mounted for rotative movement in such manner that the torsional leverage applied will be automatically increased as required according to the resistance encountered in turning said element.

These and other objects and advantages of the invention will be more fully set forth in the following description made in connection with the accompanying drawing, in which like reference characters refer to similar parts throughout the several views, and in which:—

Fig. 1 is a front elevation of a conventional type of fishing reel with an embodiment of my improved crank construction applied to the winding shaft thereof;

Fig. 2 is an end elevation of the same, the dotted lines indicating increased leverage positions of the two crank arms;

Fig. 3 is a vertical section taken on the line 3—3 of Fig. 1 and showing a suitable means for connecting the resistance springs with the crank arms and head of the crank construction;

Fig. 4 is a detail sectional view taken approximately on the line 4—4 of Fig. 1 and showing a suitable means for adjusting the tension of one of the resistance springs;

Fig. 5 is an end elevation of a somewhat different form of crank construction detached, and Fig. 6 is a similar elevational view of a still different form of the invention.

An embodiment of my improved crank construction, in Figs. 1 to 4 inclusive is illustrated as applied to a fishing reel R of well known, conventional construction, said reel having the usual winding spool S properly journaled for smooth rotation in suitable bearings provided by end members of the reel frame and driven or revolved by gear engagement with a winding shaft W disposed eccentrically of the axis of the spool and at one end of the reel in the usual manner. The driving gears are housed in the right hand end E of the reel frame.

With my improved crank construction a cross head 8 is fixed to the outer end of the winding shaft W and as shown is in the form of a flat plate carrying a centrally disposed socket member 8a extending normal to the inner side thereof, which socket is non-rotatively connected or fixed to the outer projecting end of winding shaft W.

As shown, the plate or head 8 is provided with enlarged ends 8b to which a pair of crank arms 9 are pivotally and respectively connected. As shown the enlarged end of each of the crank arms 9 is connected by a pivot bolt 10 with one of the enlarged ends 8b of the cross head, the axis of bolt 10 being disposed eccentrically of the axis of winding shaft W a distance considerably less than the length of the crank arm.

It will, of course, be understood that I contemplate the use of any suitable eccentric connection between the inner end of the crank arm 9 and the winding shaft W, whether through the medium of a cross head or otherwise.

It will also be understood that while a pair of crank arms balanced with respect to the axis of the winding shaft are utilized, my invention is equally well suited to a single crank arm of the type illustrated.

Each of the crank arms 9 is provided with a crank handle or knob 9a projecting laterally therefrom, the curved crank arms 9 being arranged symmetrically as shown in Fig. 2 with the ends and knobs thereof normally disposed in alignment with the axis of the winding shaft W.

A means for resisting outward swinging movement of each crank arm relative to the head 8 and the axis of the shaft is provided, interposed between the crank arm and the pivot 10. Either friction or spring means can be used for such resistance and as shown in Figs. 1 to 4, I provide a spiral spring 11 for each crank arm the inner extremity of which is fixed to the slotted end of pivot 10, the outer end of which surrounds a pin 9b eccentrically disposed of the axis of crank arm 9, which normally abuts against a stop shoulder 8c provided by the enlarged portion 8b of the head. Pivot 10 does not turn with crank arm 9 but is held stationary with head 8 by clamping engagement through a nut 12 engaging the inner threaded end of pivot 10. Tension placed on spring 11 may be adjusted by turning pivot 10 clock-wise or counter clock-wise according to whether less or more tension is desired and securing the same in the adjusted position by tightening the nut 12.

The extreme outward swinging of crank arms 9 relatively to the head is limited by means of shoulders 8d formed on the two enlarged portions of the head respectively which are engaged by the pins 9b carried by the crank arms.

As shown, a radially disposed indicator, such as an arrow 13, is provided at the pivoted end of the crank arms cooperating with radially arranged graduations or a scale marked on the adjacent circular portion of the cross head. The graduations may indicate various degrees of pulling force or strain imposed upon the spool or other rotary portion of the reel through force imposed upon the line when it is wound.

In operation torsional leverage on the winding shaft W through crank arm 9 is automatically increased according to requirements, that is, in accordance with the increased resistance to the turning of the shaft. The spring 11 or other means for resisting outward swinging movement of the crank arm is tensioned properly to produce the desired results. Adjustment of the tension may be made by turning shaft 10 as desired and clamping said shaft in proper position.

Any sudden resistance to winding or cranking, such as a sharp pull on the line is cushioned or absorbed through the yielding action of the crank arm 9 through resistance spring 11. In fishing reels this is a substantial advantage in that sudden pulls from large fish will not break the line. Consequently lighter lines can be used with safety for casting and consequently greater accuracy and distance can be obtained. After a fish is hooked the strain or pull imposed by the fish automatically regulates the relative leverage required and large fish may be reeled in and landed with less effort and with substantial elimination of the danger of breaking the line.

The fisherman can get some idea of the size of the fish on his line by observing the cooperating indicating means between the pivoted end of the crank arm and the adjacent portion of the head. When the fish is landed it can be approximately weighed by lifting the weight of the fish out of water, the deflection or swinging of the crank arm through the cooperating indicating means showing the approximate weight. Also by means of the cooperating indicating means a line may be tested for break resistant strength before being used.

It will be noted that with my improved construction a wide variance is possible in the amount of leverage obtained between the two extreme positions of the crank arm, with nevertheless a relatively small and compact attachment. In this connection it will be noted that the diameter of the peripheral bearing surface of the pivot 10 for the crank arm is relatively small and that the axis of the winding shaft or element mounted for rotative movement is disposed considerably outward of the said peripheral bearing surface of the pivot or crank arm bearing 10 thus making possible the wide variance in leverage.

The embodiment shown in Figs. 1 to 4 includes a pair of crank arms nicely balanced on the head 8, although it will, of course, be understood that in many instances a single crank arm will be employed, so tapered and constructed from its pivoted end to its crank handle as to nicely be balanced with reference to the axis of the winding shaft or other element mounted for rotative movement.

In Fig. 5 a somewhat different form of the invention is shown detached from the winding shaft. A head 16 in the form of a plate is utilized, non-rotatively secured to the winding shaft and at one end of the head the inner end of a crank arm 17 is suitably pivoted. A coiled spring 18 urges crank arm 17 inwardly relative to the head and winding shaft, one end of said spring being connected with the crank arm 17, the other end being connected with a projecting arm provided by the head 16. A shiftable arcuate plate 19 is provided with graduations which cooperate with an indicator arrow on the pivoted end of crank arm 17 in the manner of the indicating means described in the first form of the invention described. Plate 19 may be adjusted properly for the amount of line wound on the spool and the diameter of the winding portion of the spool by loosening the retaining screw 20 and sliding the plate to proper position and again tightening screw 20.

In Fig. 6 a still different form of the invention is shown detached from the winding shaft and including a head 22 in the form of a plate, one end of which is fixed to the winding shaft, the other end of which has pivoted thereto the crank arm 23. Means are provided for limiting the outward swinging movement of the arm. A catch member 24 is fixed to the inner portion of head 22 adapted to engage a recess or detent 23a formed in the medial portion of crank arm 23. The crank arm is thus yieldably retained in extreme inward position but will be released by an unusually strong pull on the line and will thereafter swing to its limit of outward swinging movement wherein greater torsional leverage is obtained. If desired, frictional means may be inserted between the pivoted portion of crank arm 23 and the head 22 and such frictional means may be inclined to increase resistance as the arm approaches its outward swinging limit.

From the foregoing description it will be seen that I have invented a simple and highly efficient crank construction applicable to elements of various types mounted for rotative or turning movement and wherein a crank is required to effect such turning. It further will be seen that the invention is particularly applicable to fishing reels and the like and overcomes, to a large extent, the danger of breakage of a line from sharp pulls or strains, as well as decreasing the exertion required in playing and landing large fish. It further will be seen that fish may be approximately weighed out of water and a line tested through the cooperating indicating means between the crank arm and the head on which it is mounted.

It will, of course, be understood that various changes may be made in the form, details, arrangement and proportions of the parts, without departing from the scope of my invention, which, generally stated, consists in a device capable of carrying out the objects above set forth, and in the novel parts and combinations of parts disclosed and defined in the appended claims.

What is claimed is:—

1. In combination with a reel having a winding spool upon which a flexible element may be wound and having a winding shaft, crank construction comprising a head connected with the outer end of said winding shaft, a crank arm pivoted to said head on an axis eccentric to the axis of said shaft, a handle adjacent the free end of said crank arm, means for limiting the inward swinging movement of said crank arm relatively to said head and spring means for urging said crank arm toward its limit of inward swinging movement and for yieldably resisting outward movement of said crank arm when a strain or pull is imposed on said wound flexible element, said last mentioned means normally holding said crank arm in its extreme inward position closely adjacent a straight line passing through said crank arm pivot and the axis of said shaft.

2. The structure set forth in claim 1, and means for adjusting the tension on said spring means.

3. In combination with a reel having a winding spool upon which a flexible element may be wound and having a winding shaft, crank construction comprising a head connected with the outer end of said winding shaft, a crank arm pivoted to said head on an axis eccentric to the axis of said shaft, a handle adjacent the free end of said crank arm, means for limiting the inward swinging movement of said crank arm relatively to said head, means for urging said crank arm toward its limit of inward swinging movement and cooperating indicating means including means on said crank arm adjacent the pivoted end thereof and means on said head adjacent thereto, such means cooperating to indicate the amount of strain or pull on said wound flexible element.

4. In combination with an element mounted for rotative movement, crank construction comprising a member connected with said element, a crank arm pivoted to said member for swinging movement on an axis disposed eccentric of the axis of said element, said crank arm being of greater length than the distance between its pivot and the axis of said element, means for limiting inward swinging movement of said crank arm relative to said member and spring means for urging said crank arm toward said limit of inward swinging movement and for yieldably resisting outward movement of said crank arm.

5. In combination with a driven element mounted for rotative movement, variable leverage crank construction comprising a member non-rotatively connected with said driven element, a crank arm connected to said member for swinging movement relative thereto, the pivotal connection between said crank arm and said member being in the form of a pivot member having its axis disposed eccentrically of the axis of said driven element and having a peripheral bearing surface of relatively small circumference, the axis of said driven element being located outwardly of the circumference of said peripheral bearing surface whereby relatively great variance in leverage is obtained between the extreme inward and extreme outward positions of said crank arm, said crank arm having an effective leverage length greater than the distance between its axis and the axis of said driven element, means for restricting outward swinging movement of said crank arm relative to said member beyond a predetermined point, and means for preventing outward swinging movement of said crank arm until a predetermined torsional resistance is imposed upon said driven member.

EARL H. PITNEY.